United States Patent
Kane et al.

(10) Patent No.: US 6,856,718 B2
(45) Date of Patent: Feb. 15, 2005

(54) HIGH-SPEED, LOW-POWER OPTICAL MODULATION APPARATUS AND METHOD

(75) Inventors: David Kane, Rawley, MA (US); Nicol McGruer, Dover, MA (US)

(73) Assignee: Arete' Associates, Sherman Oaks, CA (US)

( * ) Notice: Subject to any disclaimer, the term of this patent is extended or adjusted under 35 U.S.C. 154(b) by 0 days.

(21) Appl. No.: 10/142,654

(22) Filed: May 7, 2002

(65) Prior Publication Data

US 2003/0081302 A1 May 1, 2003

Related U.S. Application Data

(60) Provisional application No. 60/289,883, filed on May 8, 2001, provisional application No. 60/327,760, filed on Oct. 5, 2001, and provisional application No. 60/327,759, filed on Oct. 5, 2001.

(51) Int. Cl.[7] ................................................. G02B 6/26
(52) U.S. Cl. .......................... 385/16; 385/140; 385/147
(58) Field of Search ................................. 385/2, 6, 7, 8, 385/16, 17, 18, 140, 147; 345/89, 97; 349/37, 172

(56) References Cited

U.S. PATENT DOCUMENTS 5,699,462 A * 12/1997 Fouquet et al. ............... 385/18

* cited by examiner

Primary Examiner—Phan T. H. Palmer
(74) Attorney, Agent, or Firm—Peter I. Lippman

(57) ABSTRACT

A gap in an optical guideway is occupied, when the switch is in its diverting condition, by a quantity of air or other gas. To change the switch to its through condition, an actuator forces a column of liquid against the gas to compress (and thereby displace) the gas in the gap with the liquid. The actuator includes a preferably wide reservoir of the liquid and a diaphragm which is flexed to force the liquid up the column against the gas. When the actuator is deactivated the compressed gas forces the column of liquid out of the gap to return the switch to the diverting condition.

22 Claims, 20 Drawing Sheets

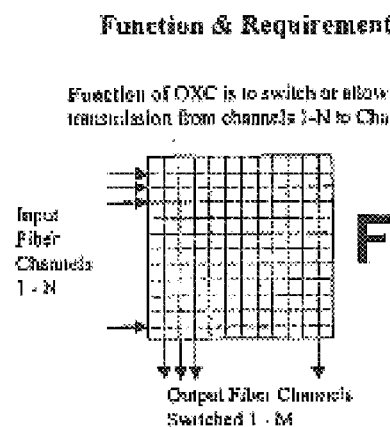
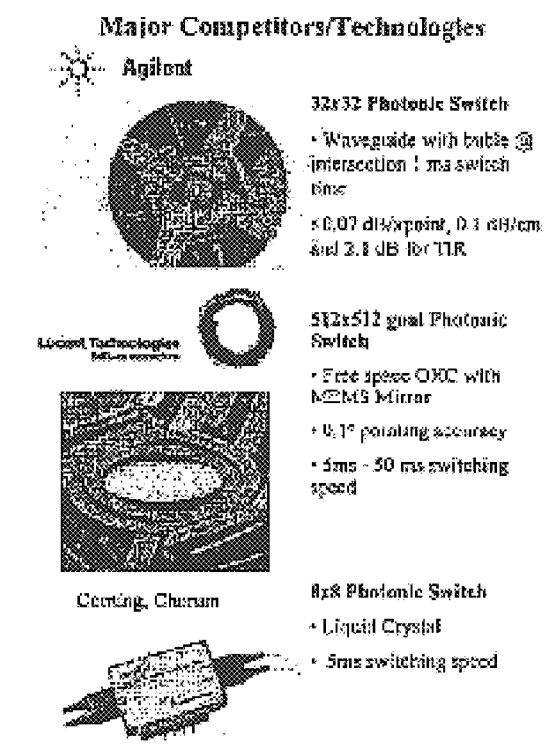
Fig. 4

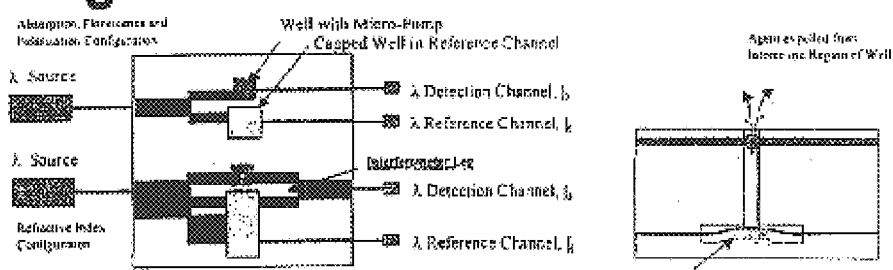
Fig. 7
Fig. 8
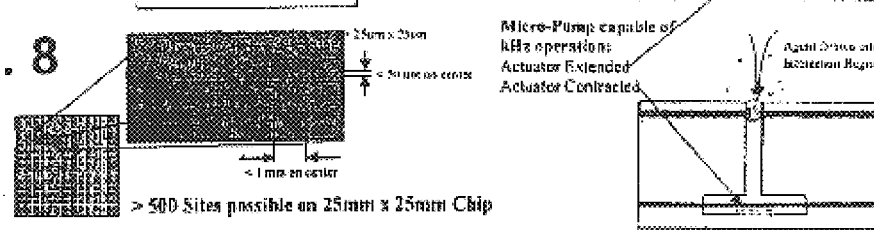
Fig. 9

0.50"ϕ x 1.5" deep

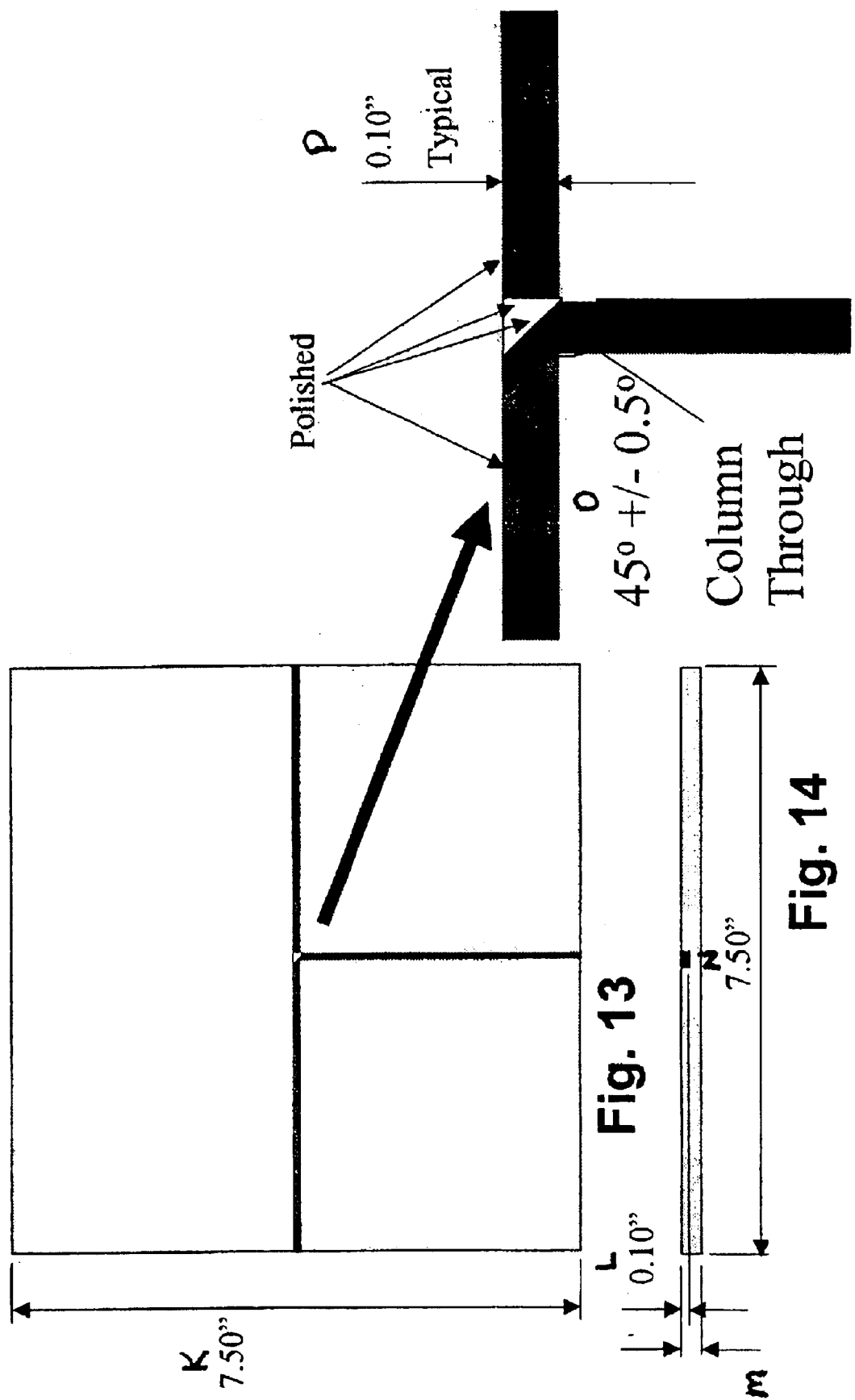

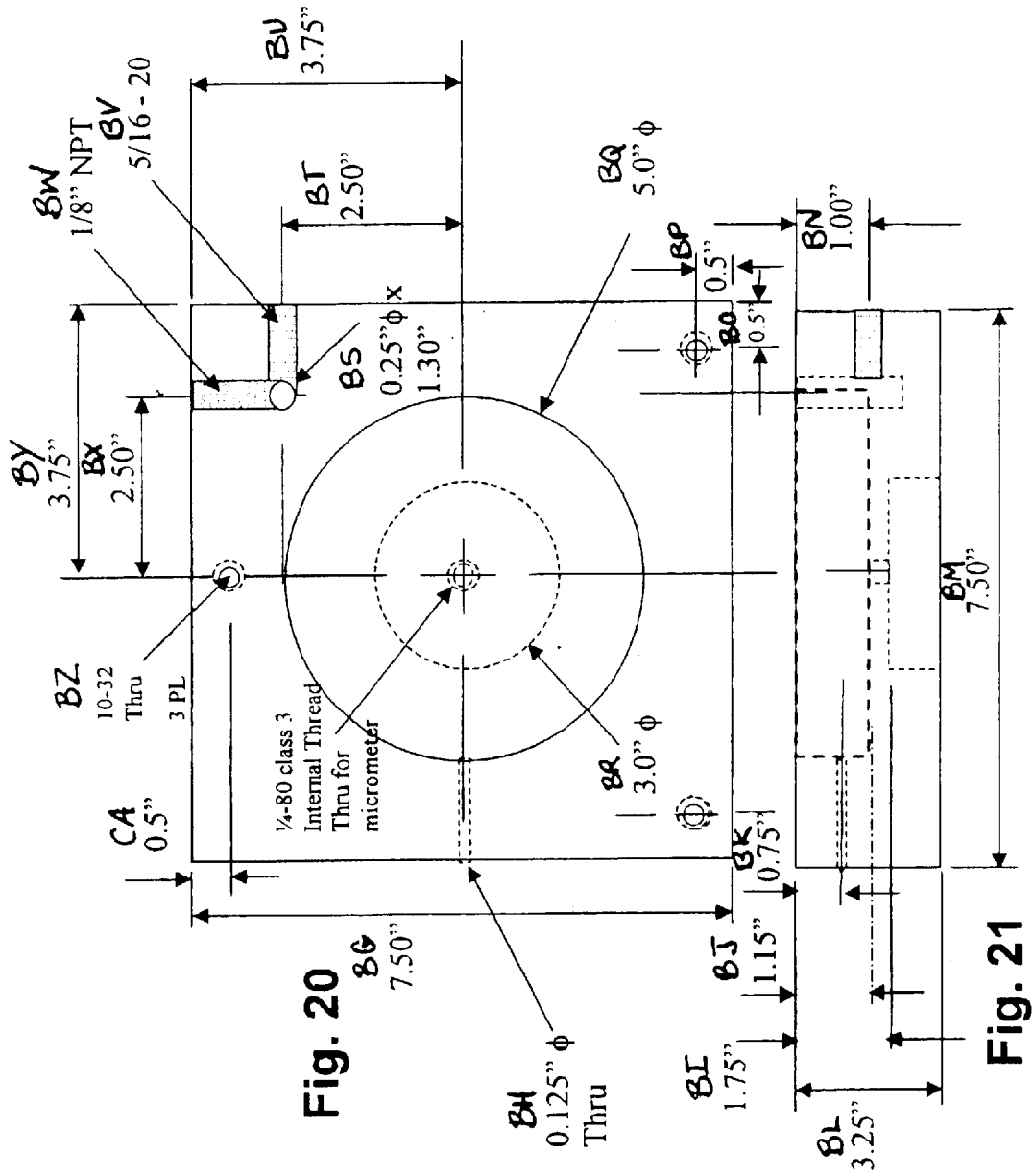

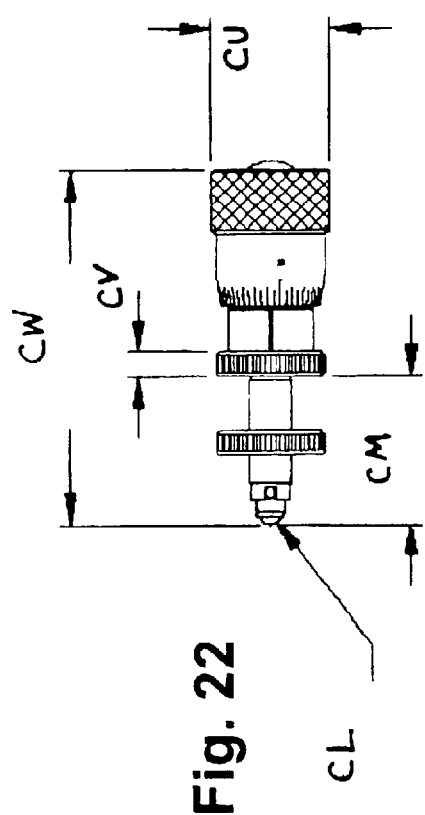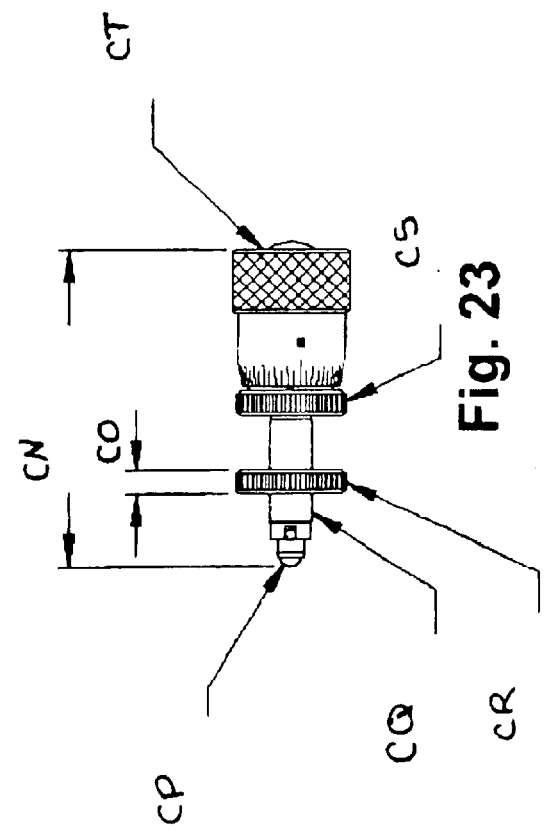

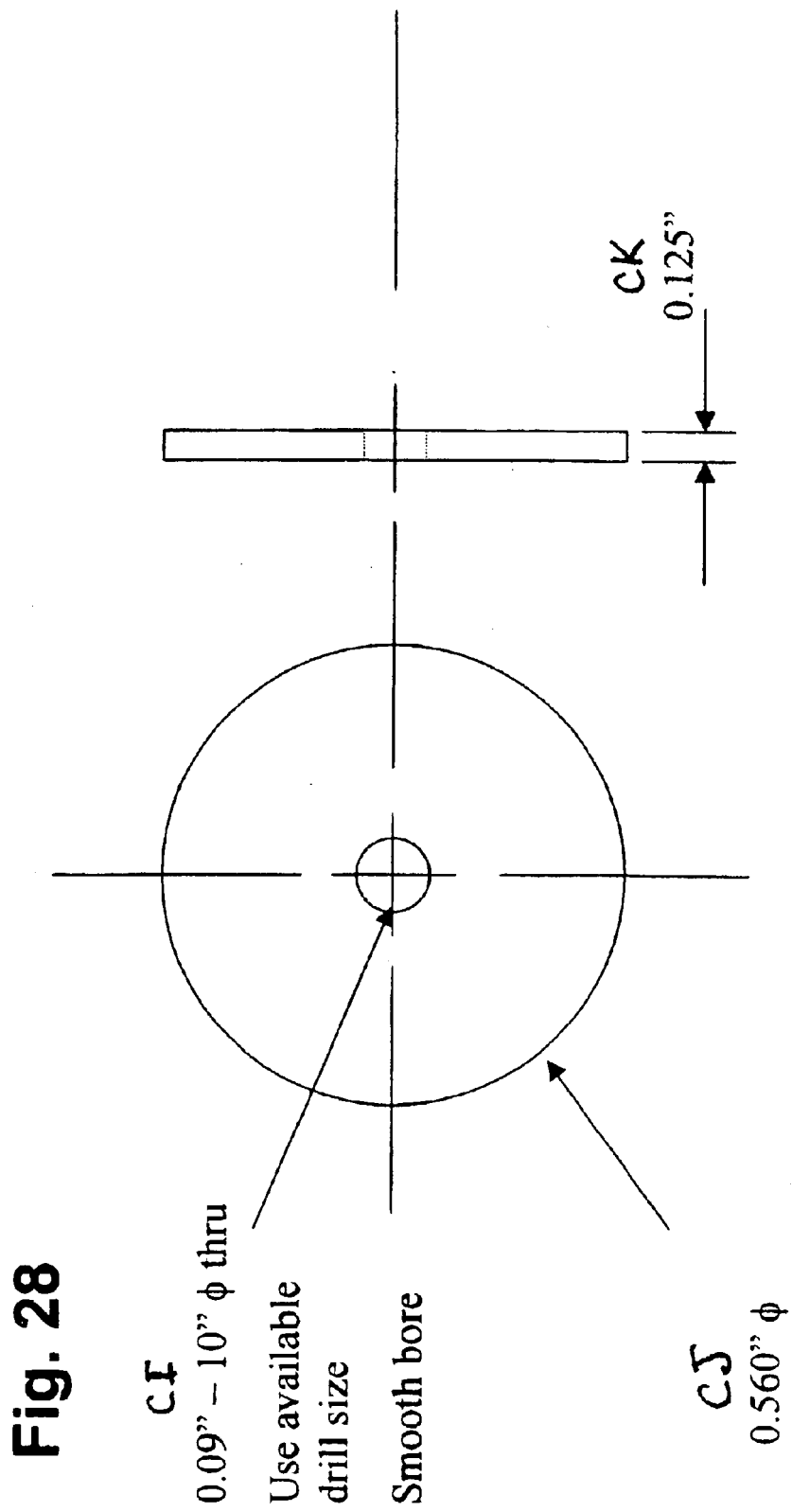

HIGH-SPEED, LOW-POWER OPTICAL MODULATION APPARATUS AND METHOD

RELATION BACK

This document is based in part upon, and claims priority from, provisional applications 60/289,883 filed May 8, 2001 and 60/327,760 of David Kane; and 60/327,759 both filed on Oct. 5, 2001 of David Kane and Nichol McGruer. All three are wholly incorporated by reference into the present document.

BACKGROUND

1. Field of the Invention

This invention relates generally to modulation of optical circuits and networks; and more particularly to method and apparatus providing faster switching or modulation speed with lower power than heretofore available.

2. Related Art

A seminal effort in this field is U.S. Pat. No. 4,988,157 of Jackel—assigned to Bell Communication. That patent teaches use of a chemically (to be more specific, electrolytically) creatable and destroyable bubble, and its implications on total internal reflection, for optical modulation.

U.S. Pat. Nos. 5,699,462 and 5,960,131 of Fouquet et al., and U.S. Pat. No. 5,978,527 of Donald, represent applications of the thermal-inkjet technology refinements of Hewlett Packard Company to light modulation or switching. Though faster than electrolysis, thermal effects operate on the order of milliseconds and accordingly are far from optimal in switching speed.

U.S. Pat. No. 5,619,600 of Pohl and U.S. Pat. No. 5,774,252 of Lin et al. represent entries in somewhat related fields on behalf of IBM and Texas Instruments, respectively; and Japanese publication 5-49055 of 1993 represents a related effort by Nippon Telegraph & Telephone Corporation. Pohl teaches tunneling of light through liquid metal, for pathlengths on the order of a fractional wavelength; possibly useful for kilohertz CW modulation, this technique too is relatively slow for switching.

As can now be seen, the related art remains subject to significant problems. The efforts outlined above—although praiseworthy—leave room for considerable refinement.

SUMMARY OF THE DISCLOSURE

The present invention introduces such refinement. In preferred embodiments of a first of its independent aspects or facets, the invention is an optical-modulation method.

It includes the step of moving exactly one liquid-gas interface, through compression or expansion of a gas bubble by the liquid. It also includes the step of using the position of the interface to control light transmission along a light path.

In a second of its independent facets or aspects, the invention is an optical-modulation method. It includes the step of compression or expansion, by a liquid, of a preexisting bubble of gas of a substance different from the liquid. It also includes the step of using relationships between properties of the liquid and the gas to control light transmission along a light path.

In preferred embodiments of its third major independent facet or aspect, the invention is an optical modulation apparatus that includes an exclusively mechanical transducer for displacing a volume of liquid as between at least two positions. It also includes an at least partially mechanical actuator for operating the transducer.

The apparatus also includes an optical transmission path that intersects the liquid volume when the volume is in one of the positions, and that does not intersect the volume when the volume is in another of the positions.

In preferred embodiments of its fourth major independent facet or aspect, the invention is optical modulation apparatus. It includes a fluidic transducer having stroke amplification through a ratio of cross-sections between driving and driven stages.

It also includes a variable-reflection optical cell having a control liquid displaced by the driven stage of the transducer. In addition, the apparatus includes an optical transmission path modulated by the cell All of the operational principles and advantages of the present invention will be more fully appreciated upon consideration of the following detailed description, with reference to the appended drawings, of which:

BRIEF DESCRIPTION OF THE DRAWINGS

FIG. 4 is a set of comparative illustrations and related cross-references summarizing the general state of the art;

FIG. 7 is a plan view of an analogous configuration for a chip-based waveguide in a chemical or biological sensor—in this case, the FASA being used to direct material into one or another different detection channel;

FIG. 8 is a conceptual diagram suggesting disposition of a large multiplicity of such sensors on a single chip;

FIG. 9 is a pair of cross-sectional elevations analogous to FIGS. 2, 6 etc. but showing expulsion or acquisition of the specimen by the well of the FASA;

FIG. 13 is a plan of the waveguide layer 3 in FIG. 11, and at right a highly enlarged inset view of the intersection detail;

FIG. 14 is an elevation view of the FIG. 13 waveguide layer;

FIG. 20 is a plan view like the upper views in FIGS. 15 through 18, but for the base 5 in FIG. 11;

FIG. 21 is an elevation, partly in section, like the lower views of FIGS. 15 through 18, but for the FIG. 20 base;

FIG. 22 is an external elevation of the actuator 9 in FIG. 11, with its movable spindle fully retracted;

FIG. 23 is a like view but with the same spindle fully extended;

FIG. 28 is a disc 13 (not shown in FIG. 11).

DETAILED DESCRIPTION OF THE PREFERRED EMBODIMENTS

Figure 1:
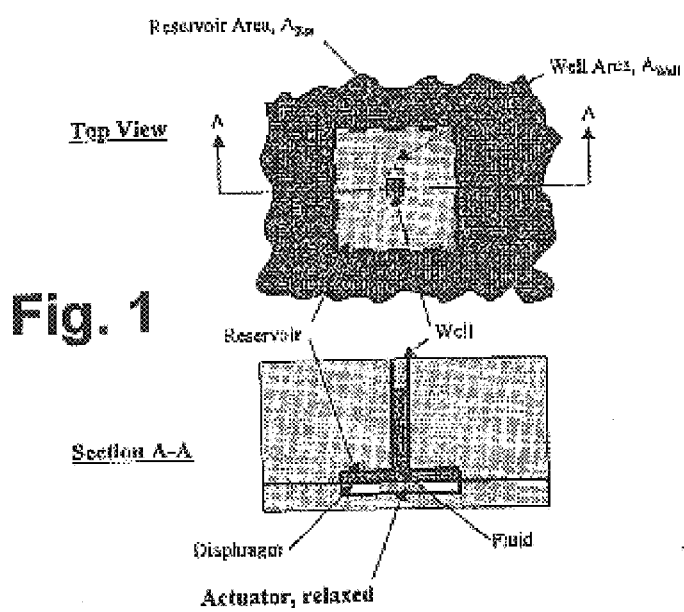
FIG. 1 is a two-part diagram of a fluidic actuator-stroke amplifier used in preferred embodiments of the invention, the upper section of the diagram being in plan, and the lower in elevational cross-section—and showing the actuator relaxed so that the liquid level is relatively low.

Some of the preferred embodiments of the invention are discussed in this section; they provide a high-speed, low-energy optical switch.

A gap in an optical guideway is occupied, when the switch is in its diverting condition, by a quantity of air or other gas. To change the switch to its through condition, an actuator forces a column of liquid against the gas to compress (and thereby displace) the gas in the gap with the liquid.

The actuator includes a preferably wide reservoir of the liquid and a diaphragm which is flexed to force the liquid up the column against the gas. When the actuator is deactivated the compressed gas forces the column of liquid out of the gap to return the switch to the diverting condition.

Viewed broadly, the prior-art patents disclose optical switches which operate by exchanging gas and liquid in a gap in an optical guideway. These devices utilize either micro-heaters or electrolytic devices to alternatively create and dissipate gas bubbles in the gap, or to shift a gas bubble into and out of the gap. Thus the specific means for changing the medium in the gap from a gas to a liquid and back are different from those of the present invention, which preferably use an actuator in which a liquid column compresses a gas body to effect the change.

As to the actuator itself, prior-art diaphragm-deflection devices typically are not used to compress a gas body, but rather to eject material, particularly liquid.

Thus the present device uses different means to accomplish the switching, as compared with heaters and electro-optical devices. There is no teaching in the prior art of using the types of actuator discussed herein for a similar purpose, i.e. compressing and thereby displacing a body of gas, a preexisting bubble, from a gap in the optical guideway.

The invention is not limited to specific types of actuator; but those which are specifically discussed herein particularly include devices that are essentially mechanical—as distinguished from those that involve chemical reactions (as in an electrolytic system) or thermal-vaporization phenomena (as in an inkjet system). The mechanical device, however, may be driven in any one of a variety of ways and not necessarily by electrical triggering; for example it might be triggered by an optical signal—either producing thermal effects or otherwise—and this would have the benefit of maintaining more nearly an overall all-optical system.

Another advantageous feature of some actuators specifically discussed in this document is use of a single fluid/liquid-gas interface at which liquid compresses gas. Release of that pressure restores the interface position.

Some others do have at least one interface, but in the electrolytic case the interface is a transient phenomenon (the bubble is not preexisting)—and in the thermal case the closest embodiment appears to have not one but two interfaces, and without significant compression (see e.g., the Fouquet patents mentioned earlier, in which a dual-interface bubble of generally constant size is translated into and out from the optical path). In preferred embodiments of the present invention, by comparison, there is only one stable interface and only its position varies during operation.

The present invention offers the following advantages over prior-art switches:

- much shorter switching time, namely submicroseconds vs. one or two milliseconds;
- much less power consumption—by orders of magnitude; and
- possibly, a higher density of switches—to the extent that the actuators occupy less space than the heaters etc. of the prior art.

The accompanying drawings are self explanatory and show myriad details of a constructed, operative and highly preferred embodiment that has been actually reduced to practice at the expense of the assignee.

Figure 2:
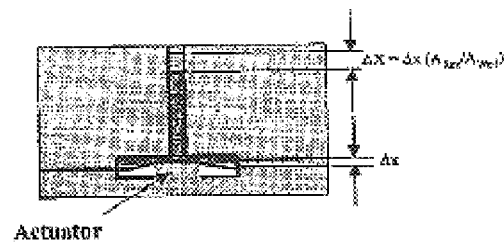
FIG. 2 is another elevational cross-section like the bottom part of FIG. 1, but with the actuator extended to push the diaphragm and thereby liquid upward, expelling some fluid from the reservoir into the well.

The "fluid-based actuator stroke-amplification" (FASA) system provides a method for the amplification of relatively short-stroke actuators such as piezoelectric, electrostrictive or magnetostrictive devices. In this implementation, an actuator displaces a diaphragm adjacent to a fluid reservoir by $\Delta x$ as illustrated in FIG. 2. The resulting volume of the reservoir is changed by $(A_{Res}) \cdot (\Delta x)$. A well of cross-sectional area $A_{well}$ is coupled to the reservoir, and the fluid column in the well will travel a distance $\Delta X$ that is proportional to:

$$\Delta X = \Delta x \cdot (A_{Res}/A_{Well})$$

Figure 3:
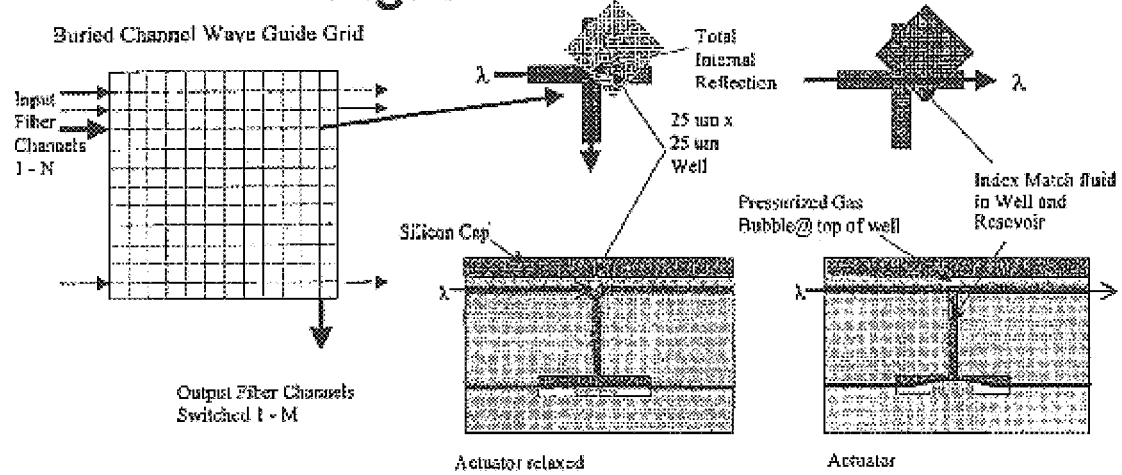
FIG. 3 is a multipart diagram showing at left a buried-channel waveguide-array grid, at upper right two plan views of one individual waveguide of the array—with the "FASA" in the left-hand one of those two views set for total internal reflection ("TIR"), and in the right-hand one of those two views set for transmission by virtue of an operational (i.e. imperfect) index match of fluid in the well with the material of the optic fiber or other waveguide proper—and at lower right two corresponding elevational cross-sections as before (i.e. the left-hand one showing the transducer and diaphragm set for TIR; and the right-hand one, for transmission)

One device that can take advantage of the FASA is an all-optical crossconnect system that uniquely "switches" incoming light from fiber optic channels 1-N into Outgoing Channels 1-M as suggested in FIG. 3. In this implementation, a buried waveguide (FIG. 4) is configured in a grid arrangement with horizontal waveguides for incoming light, channels 1-N, and vertical waveguides for channels 1-M.

At each intersection is a FASA well that is at a 45° angle, with a column perpendicular to the waveguide gridwork as shown. At the base of each column is the reservoir for the FASA and the forcing actuator.

When the actuator is relaxed, a gas is present at the waveguide intersection and total internal reflection (TIR) occurs for any light entering horizontally—which is accordingly reflected vertically as shown, due to the difference in refractive index. When the actuator is extended Δx, the index-matched fluid column relative to the waveguide will rise by ΔX and transmission through the intersection will result as shown.

A FASA system is located at each horizontal/vertical waveguide intersection. Through the ability to independently switch each FASA, an optical switch results.

Currently there are three technologies used to provide all-optical switches. First is the buried waveguide technology, with index-matched fluids that either are present or absent at an intersection as shown in FIG. 4.

Agilent (reference in FIG. 4) is utilizing inkjet technology to accomplish this task; the FASA system introduced here provides an advantageous alternative. Lucent and other vendors are proposing free-space solutions, where MEMS mirrors pop up to "switch" channels. Chronus is proposing a liquid-crystal device for switching.

Primary advantages of the FASA approach are switching speed faster by ten to a hundred times, and power consumption approximately one tenth.

Figure 10:
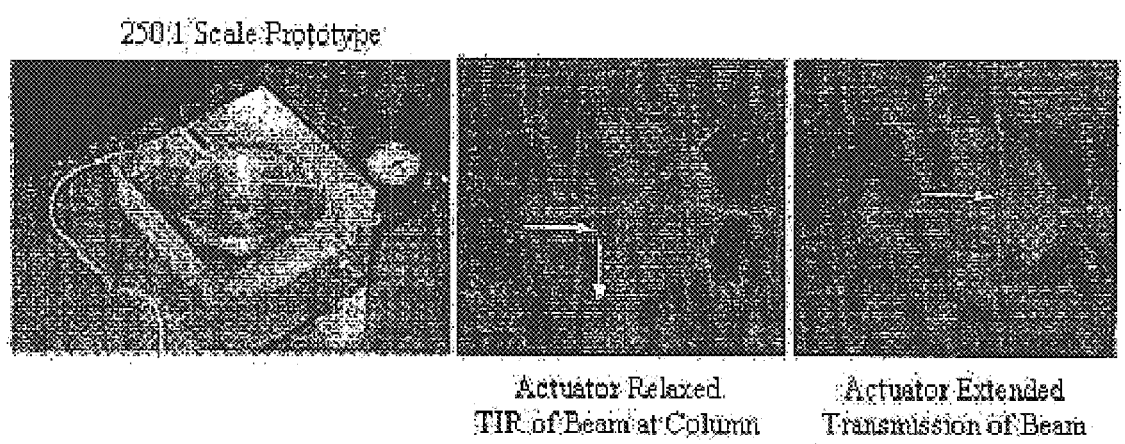
FIG. 10 is a triad of photographs, the first showing an oversize (250:1 scale) acrylic and polycarbonate prototype of a $\mu$FASA—i.e. what may be called a "milliFASA" or "mFASA"—and the second and third showing an actual demonstration of successful operation, with light reflected and transmitted, respectively, at the junction.
Figure 11:
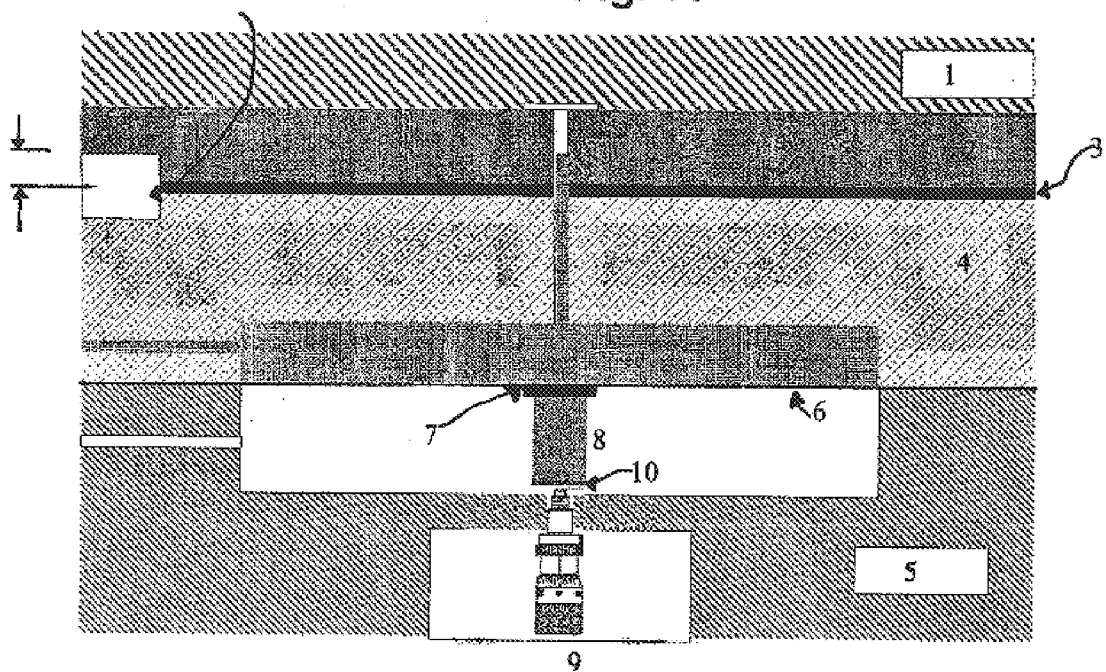
FIG. 11 is an elevational cross-section, somewhat conceptual, of a $\mu$FASA (and very nearly the mFASA prototype) assembly, essentially an assembly drawing and with parts numbered for keying to many of the following drawings.
Figure 12:
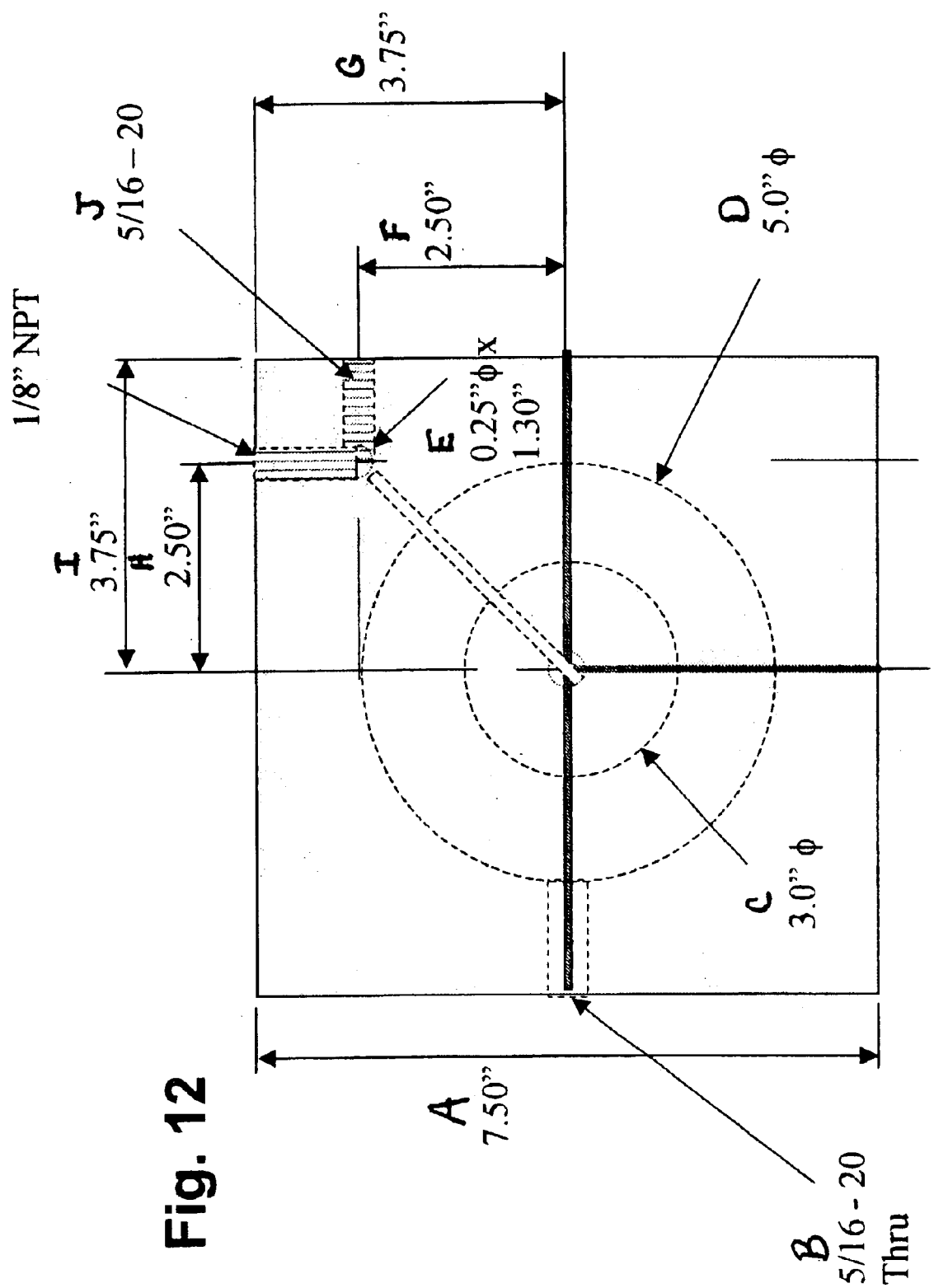
FIG. 12 is a corresponding plan view of the FIG. 11 top-level assembly.
Figure 15:
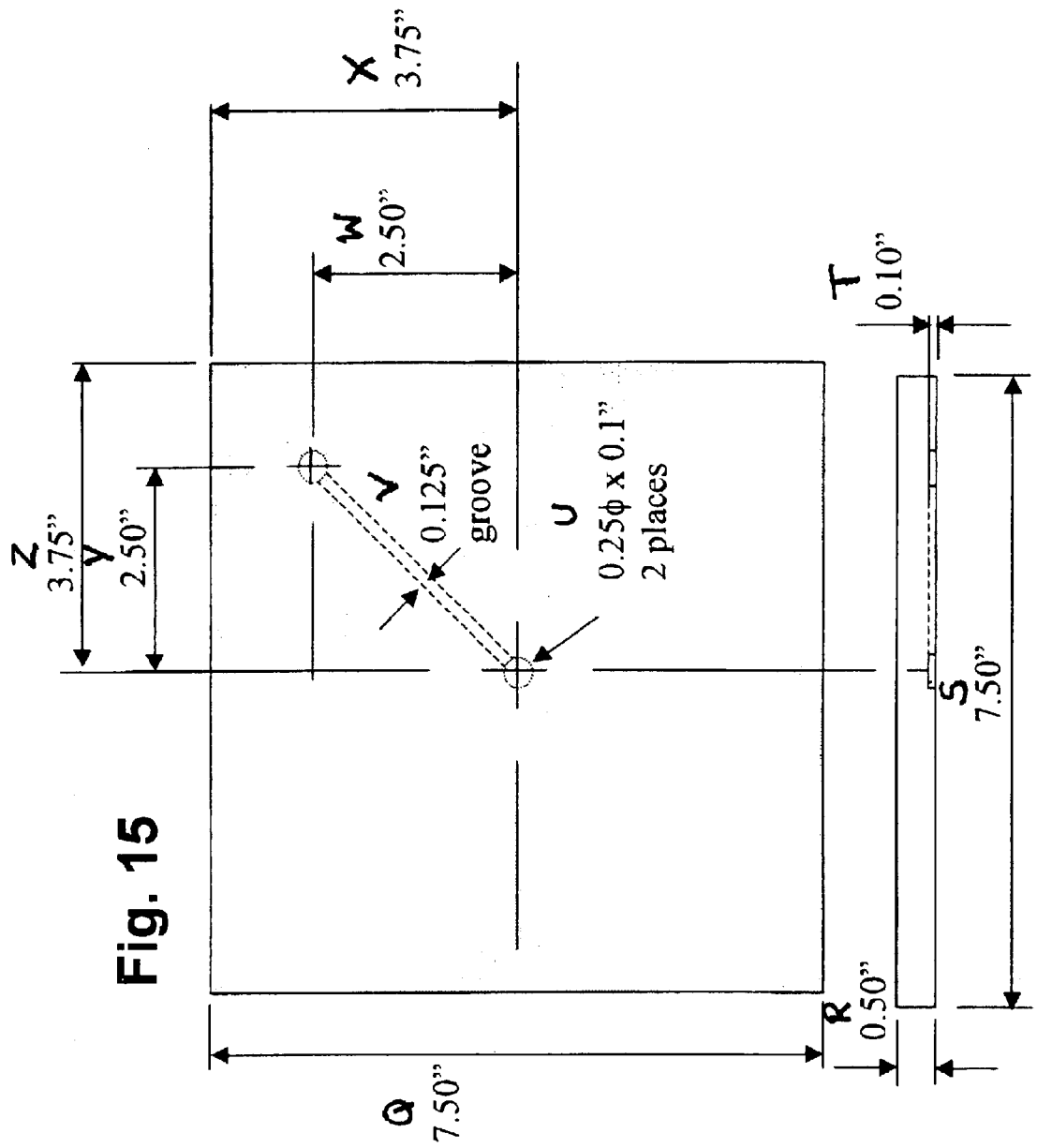
FIG. 15 is a plan with associated elevation, partly in section, of the top cap 1 in FIG. 11.
Figure 16:
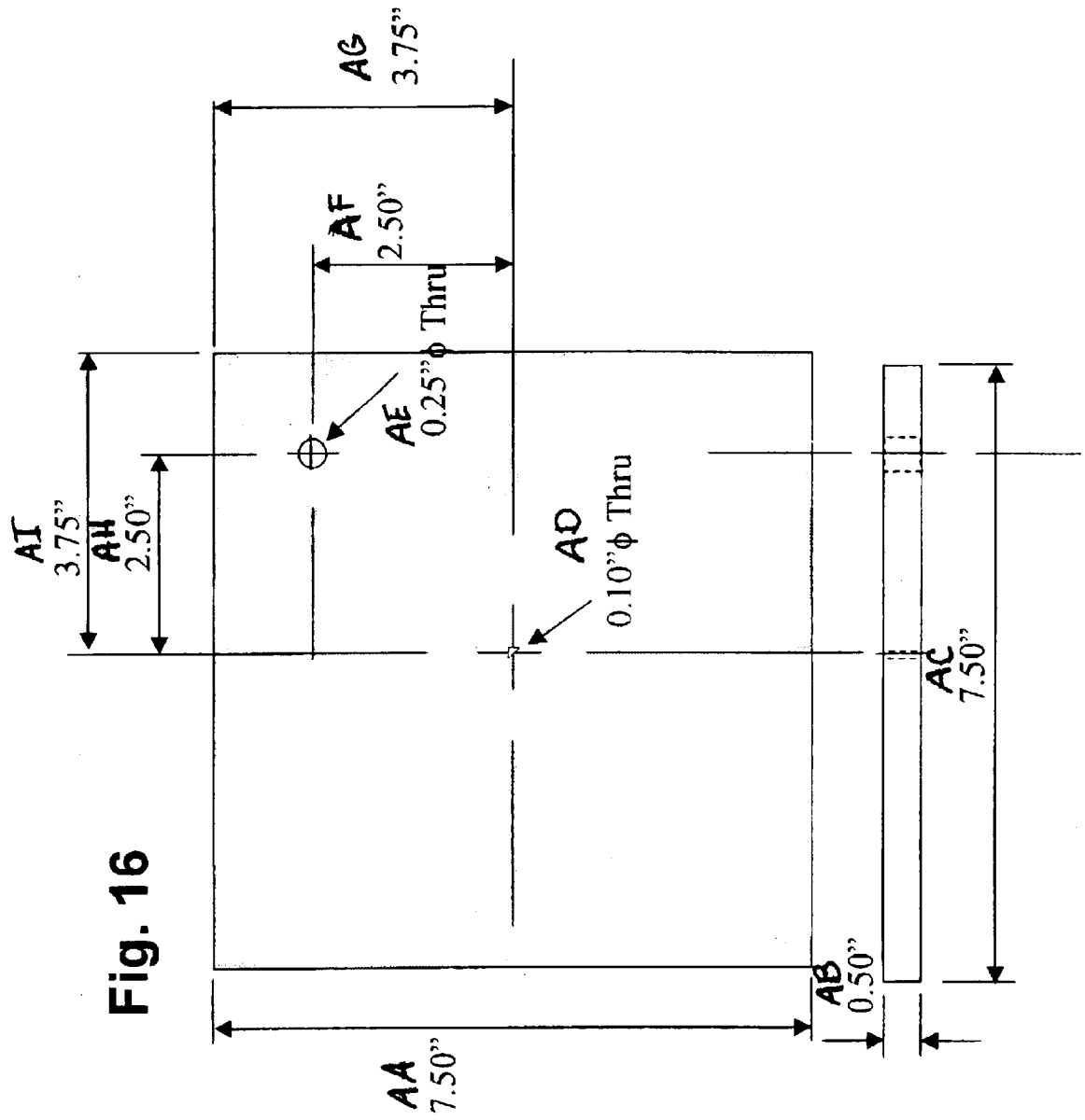
FIG. 16 is a like drawing pair but showing instead the top column 2 in FIG. 11.
Figure 17:
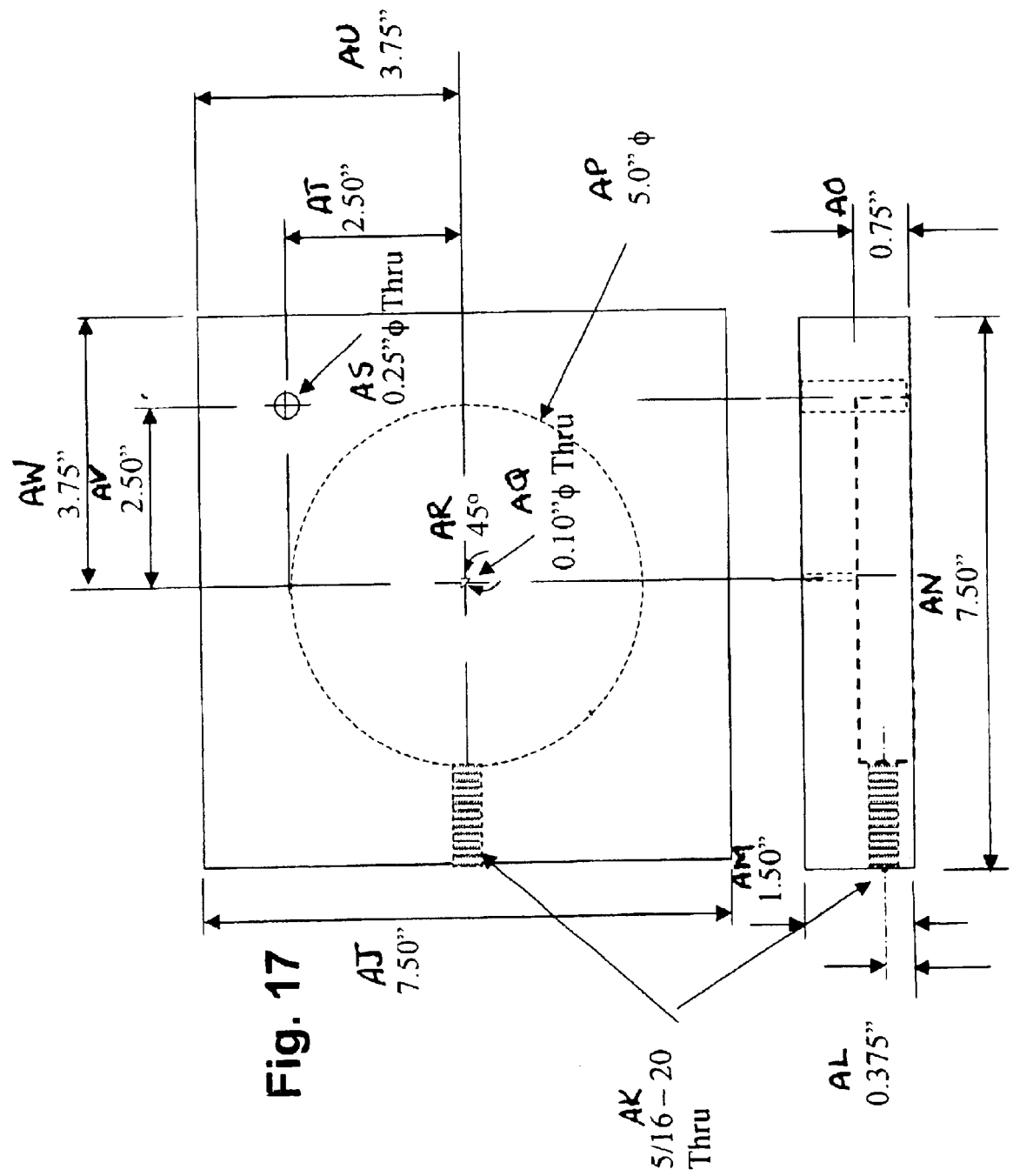
FIG. 17 is a like pair but for a reservoir 4 in FIG. 11.
Figure 18:
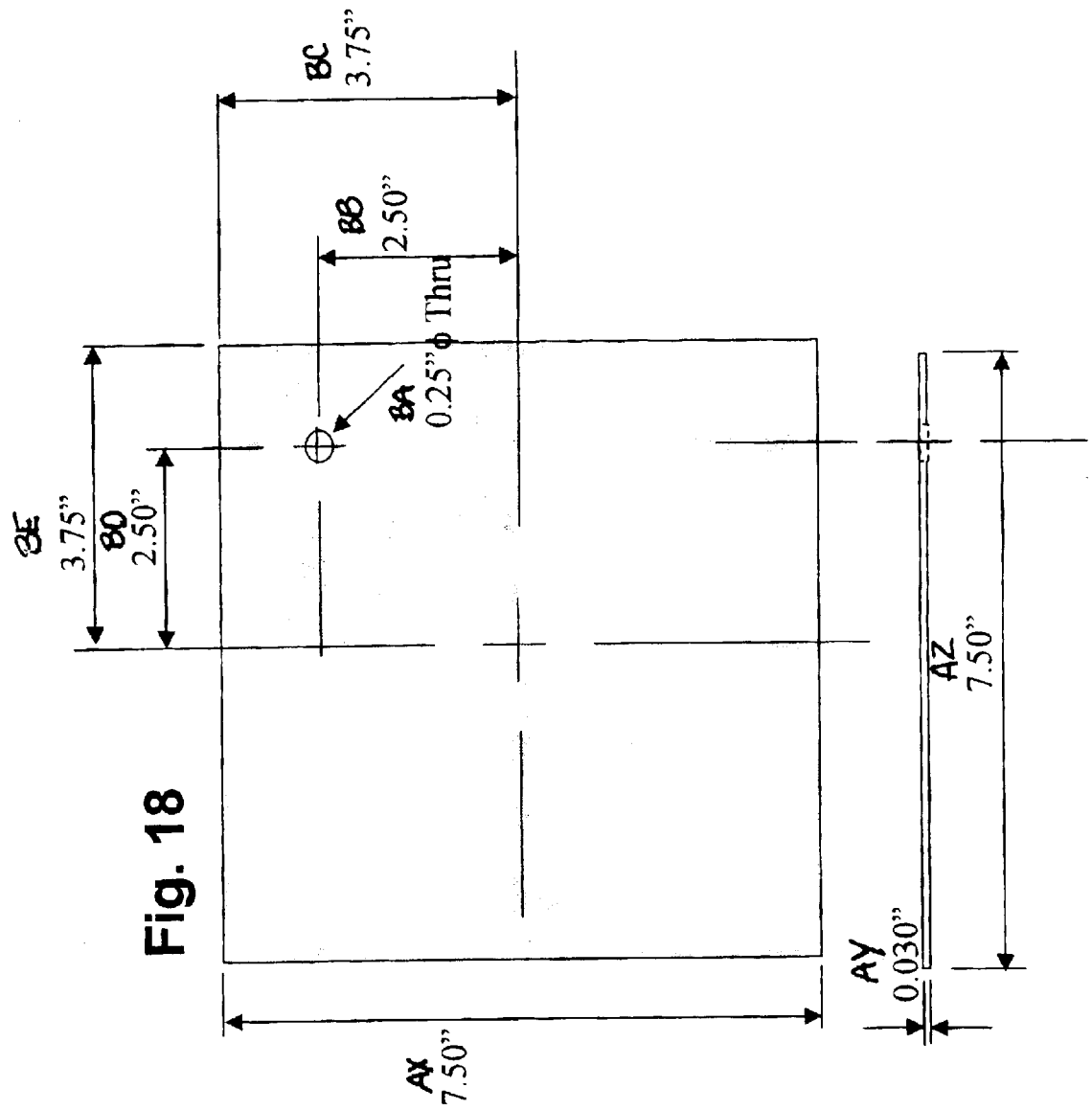
FIG. 18 is a like pair for the membrane 6 in FIG. 11.
Figure 19:
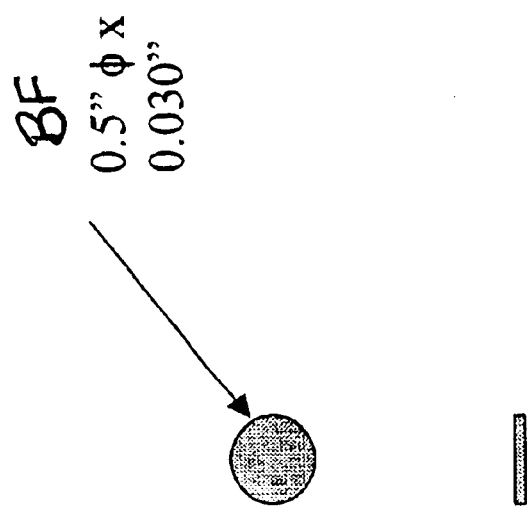
FIG. 19 is a like pair, but with no part in section.
Figure 24:
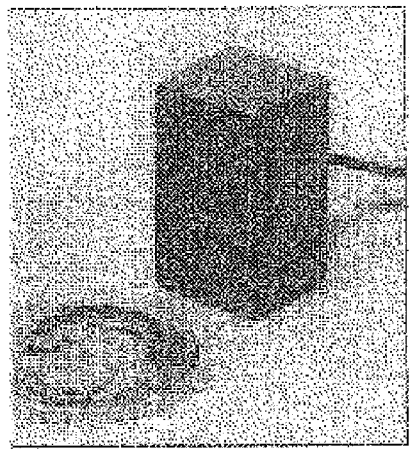
FIG. 24 is a photograph of the piezoelectric stack 8 in FIG. 11, also showing a U.S. dime for scale.
Figure 25:
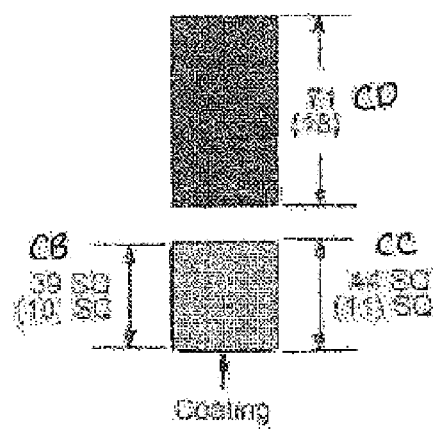
FIG. 25 is a pair of drawings—elevation and plan views respectively for the FIG. 24 stack.
Figure 26:
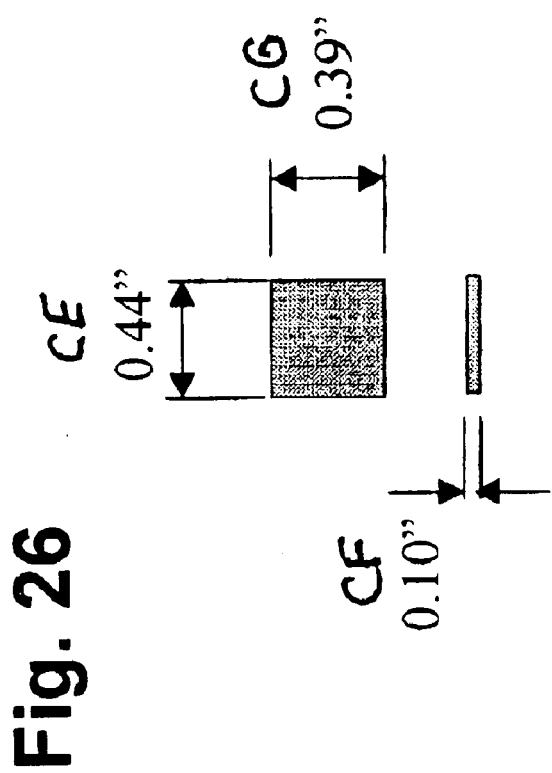
FIG. 26 is a like pair of drawings for an actuator shim 12 (not shown in FIG. 11)
Figure 27:
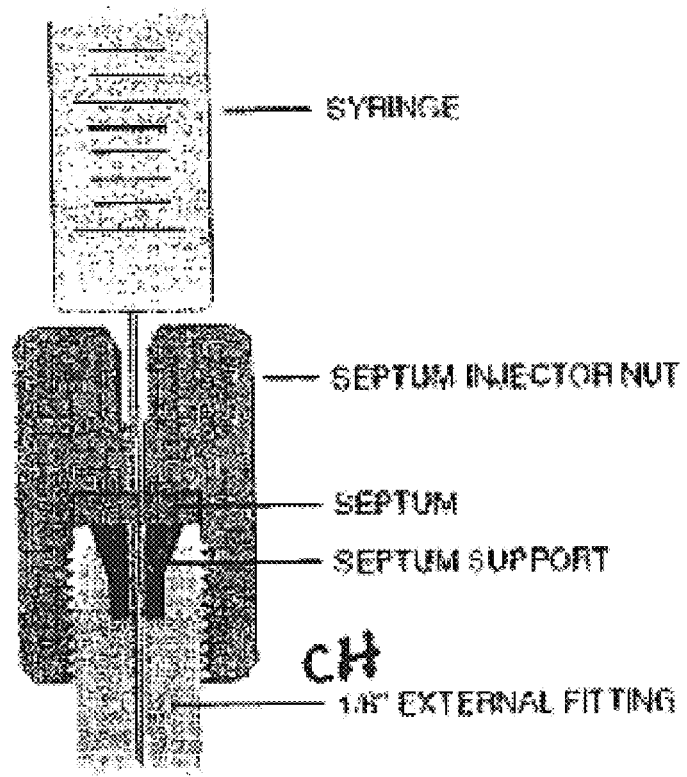
FIG. 27 is an longitudinal section, in elevation, for a septum injector nut that is used for filling.

A 250:1 scale acrylic/polycarbonate prototype of a single actuator/fluid column junction with 500:1 stroke amplification has been built and demonstrated as a reduction to practice of $\mu$FASA optical switching. A photo of the prototype and imagery of the two switch states (FIG. 10), and assembly diagrams of the apparatus (FIGS. 11 and 12)—together with individual component detail drawings (FIGS. 13 through 28) document this demonstration of a single mFASA switch.

With the actuator relaxes (second image of FIG. 1), an air bubble resides at the waveguide-column interface. As a result, the input laser beam reflects from the interface at a 90° angle, due to TIR as shown. Because of multimode operation at this scale, some of the laser beam passes through the intersection.

In the FIG. 2, the actuator 8 is extended—and isopropyl alcohol that is in the reservoir and column compresses the bubble at the top of the column, so that now fluid is at the waveguide/column interface. Under these conditions the light beam can propagate through the region as shown.

The actuator (FIGS. 22 and 23) is a product from Thor-Labs of Newton, N.J. It has a movable spindle CL in fully retracted position, and CP in fully extended—with total travel of 250 $\mu$m minimum. It has a ¼-80 external thread CQ (class 3 fit) and coarse travel-locking nut CR.

The entire body CS rotates for coarse travel. The fine adjust CT makes 25 $\mu$m per revolution, advancing at 0.5 $\mu$m per smallest graduation. The stack 8 actuates finely also.

The dimensions are: CW 2.08 inch (53 mm), CV 0.15 inch (3.8 mm), CU diameter 0.69 inch (17.6 mm), CM 0.86 inch (22 mm), CH 1.88 inch (47 mm), CO 0.13 inch (3.3 mm).

Figure 5:
FIG. 5 is a pair of diagrams like FIG. 1, but for a different application of the FASA—namely, placement of a chemical or biological specimen into an analytical light beam.
Figure 6:
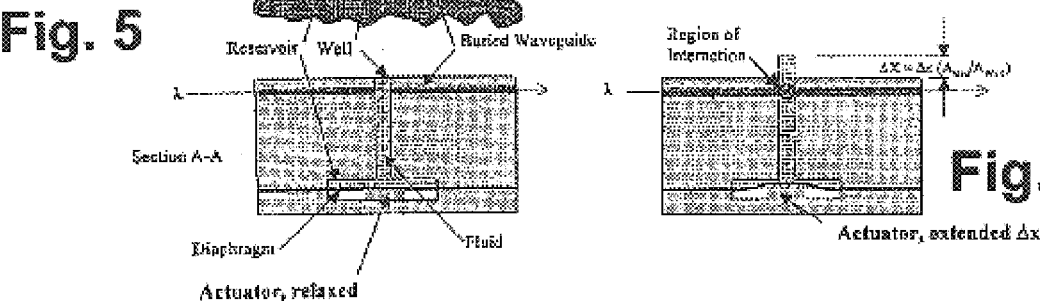
FIG. 6 is a diagram analogous to FIG. 2 but for the FIG. 5 application.

A second application of the FASA is as a micropump, used to draw and expel chemical or biological molecules into the well, in a region where light from a waveguide interacts with the molecule (FIGS. 5 and 6). In this configuration, the wall of the well is perpendicular to the waveguide and light is transmitted through the well as shown.

The intent is to identify the molecule by unique signatures associated with fluorescence, index or polarization variation, or combinations of these. In all configurations, a reference leg closed to the atmosphere provides the baseline signal, and this is compared to the open well where the molecule interacts with the light traveling through the buried waveguide—based on detector output (FIGS. 7 and 8). Here there are a relative intensity comparison in the first configuration, and an interferometer imbalance due to phase change as a result of varying index in the second.

It will be understood that the foregoing disclosure is intended to be merely exemplary, and not to limit the scope of the invention—which is to be determined by reference to the appended claims.

What is claimed is:

1. An optical-modulation method comprising the steps of:
   moving exactly one liquid-gas interface, through manipulation of a gas bubble by the liquid; and
   using the position of the interface to control light transmission along a light path.

2. The method of claim 1, wherein:
   the gas bubble is a preexisting bubble, neither formed nor destroyed during a cycle of the modulation method.

3. The method of claim 2, wherein:
   the gas bubble is of a substance different from the liquid.

4. The method of claim 3, wherein:
   the using step comprises controlling the transmission by variation of reflection at a chamber containing the bubble and liquid.

5. The method of claim 4,
   further comprising the step of expansion of the preexisting bubble when pressure from the liquid is relieved; and
   wherein the compression or expansion step, or both, comprises mechanically displacing a volume of the liquid.

6. The method of claim 5, wherein:
   the displacing step comprises shifting a diaphragm in contact with the liquid, without applying heat to the diaphragm or the liquid.

7. The method of claim 6, wherein:
   the shifting step comprises energizing a linear actuator.

8. The method of claim 7, wherein the energizing step comprises operating:
   a piezoelectric device; or
   a solenoid; or
   a magnetostrictive device; or
   an electrostatic attractor or repellor; or
   an optically energized device.

9. The method of claim 4, wherein the variation comprises shifting between:
   substantially total reflection; and
   a smaller amount of reflection.

10. The method of claim 9, wherein:
    the smaller amount of reflection is a substantially unavoidable level of reflection for the liquid and a material of the chamber.

11. The method of claim 4, wherein the chamber is interposed along the path; and:
    the reflection is used to control transmission across the chamber.

12. The method of claim 2, wherein:
    the using step comprises controlling the transmission by variation of reflection at a chamber containing the bubble and liquid.

13. The method of claim 12, wherein:
    the moving step comprises mechanically displacing a volume of the liquid, substantially without heating the liquid or the bubble.

14. The method of claim 13, wherein:
the displacing step comprises shifting a diaphragm in contact with the liquid, substantially without heating the diaphragm or the liquid.

15. The method of claim 14, wherein:
the shifting step comprises energizing a linear actuator.

16. The method of claim 15, wherein the energizing step comprises operating:
a piezoelectric device; or
a solenoid; or
a magnetostrictive device; or
an electrostatic attractor or repellor; or
an optically energized device.

17. The method of claim 12, wherein the variation comprises shifting between:
substantially total reflection; and
a smaller amount of reflection.

18. The method of claim 17, wherein:
the smaller amount of reflection is a substantially unavoidable level of reflection for the liquid and a material of the chamber.

19. The method of claim 12, wherein the chamber is interposed along the path; and:
the reflection is used to control transmission across the chamber.

20. An optical-modulation method comprising the steps of:
compression, by a liquid, of a preexisting bubble of gas of a substance different from the liquid; and
using relationships between properties of the liquid and the gas to control light transmission along a light path.

21. The method of claim 20, wherein:
the gas bubble is trapped by the liquid against the end of a tubulation; and
expansion of the bubble against the liquid provides restoring force for return of the single liquid-air interface when pressurization of the liquid is relaxed.

22. The method of claim 20, wherein:
the gas bubble is neither formed nor destroyed during a cycle of the modulation method.

* * * * *